United States Patent Office 3,209,254
Patented Sept. 28, 1965

3,209,254
DEVICE FOR MEASURING PHASE ANGLES
BETWEEN OSCILLATIONS
Marcel Hossmann, Zurich, Switzerland, assignor to Albiswerk Zürich A.G., Zurich, Switzerland, a corporation of Switzerland
Filed May 24, 1962, Ser. No. 197,389
Claims priority, application Switzerland, June 1, 1961,
6,424/61
4 Claims. (Cl. 324—83)

My invention relates to electric circuits for digital measurement of the phase angle between two oscillations, such as alternating voltages, of the same frequency.

In a known system of this type a bistable multi-vibrator is switched to conductive condition by a pulse indicative of the phase position of the first oscillation and is switched to blocked (non-conductive) condition by a pulse indicative of the phase position of the second oscillation. A measuring gate stage is opened during the conductive condition of the multivibrator and then passes a high-frequency pulse sequence to a counter.

This known system, in general, furnishes satisfactory results. However, a single measuring operation of the kind described is not sufficient for measuring the phase angle between two oscillations, which, due to irregularities, exhibits statistical scattering. Such irregularities can be compensated by multiple repetition of the measurement, and adding the measuring results. The final result can be determined in two ways. When the number of repetitions is always the same, then the sum of all results is the equivalent of a measuring operation performed at a higher pulse frequency. The second way provides for any desired number of measuring operations, in which case the sum result is to be divided by the number of measuring operations in order to obtain the arithmetic mean.

In both cases the number of measuring operations is not limited, and the final result increases in accuracy with an increasing number of measuring operations. Both measuring methods, however, possess the disadvantage that phase angles corresponding nearly to $2\pi$ or nearly to 0, may become misleading or difficult to interpret because irregular oscillations may cause a result somewhat below $2\pi$ in one case but an amount somewhat above $2\pi$ in another case. For example, a first measuring operation may have the result 359°, and a second measuring operation may have the result 1°, and the arithmetic mean then obtained shows 180° whereas it should have shown 360°.

An object of my invention, relating to a digital phase measuring system generally of the initially mentioned kind, is to eliminate such disadvantages and to increase the reliability and univalency of the measuring results.

To this end, and in accordance with a feature of my invention, I provide the measuring system with means that automatically repeat the measuring operation a number of times and form the arithmetic mean from these measurements; and for preventing measuring errors due to dispersion or scattering at very small or very large phase angles, the system is further provided with a phase comparator circuit which controlling a timing device which, at very large and very small phase angles, delays the initiation of the blocked condition in the above-mentioned bistable multivibrator up to the arrival of the second pulse derived from the second oscillation, or which delays the initiation of the conducting condition in the multivibrator up to the arrival of the second following pulse to rise from the first oscillation. Thus the phase shift for very large and very small angles is measured in the range of 360°.

These and more specific features of my invention, as well as the objects pursued thereby and the advantages achieved, will be more fully explained with reference to the embodiment of a phase-angle measuring digital system according to the invention illustrated by way of example on the accompanying drawings, in which.

Figure 1:
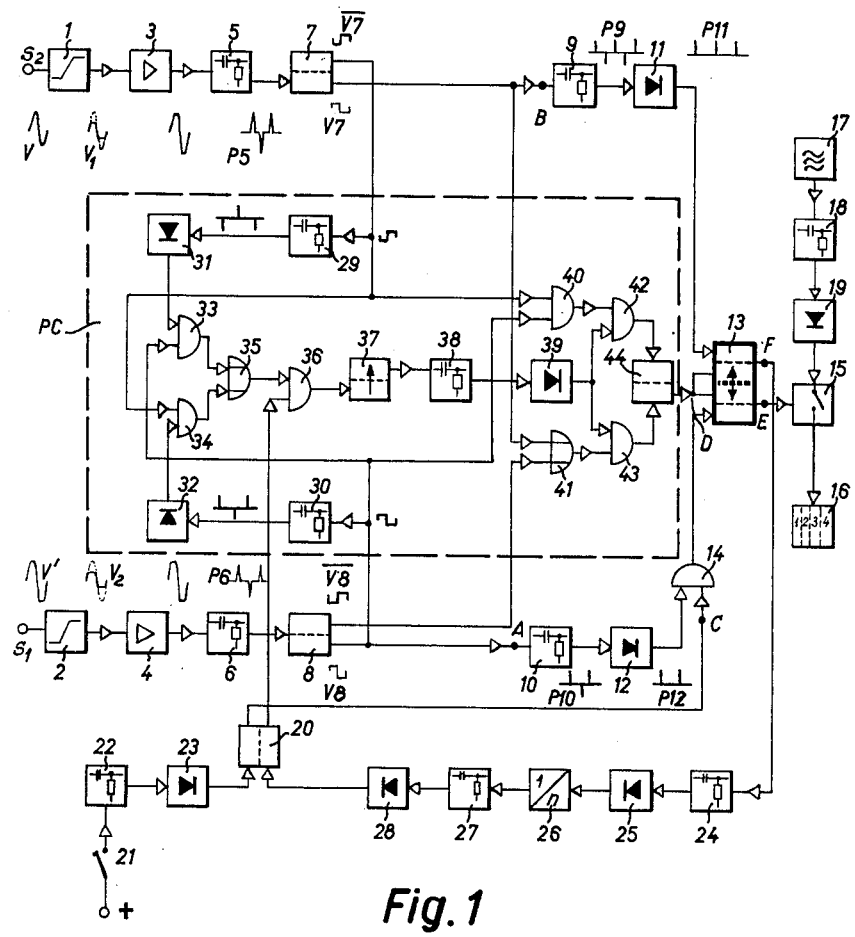
FIG. 1 is a block diagram of the entire system.

In FIG. 1 the two oscillations, constituted by respective alternating voltages at terminals $S_1$ and $S_2$ are schematically represented by wave shapes V and V'. The system serves to measure and digitally represent the phase angle between these two voltages. The two voltages are converted in known manner so as to obtain respective pulses at the zero passages of the oscillations, and the pulses control a bistable multivibrator in which the duration of the conducting condition is a measure of the phase angle to be determined.

The signal flow or travel direction is indicated in the block diagram by the following symbols: Arrowheads which touch the block symbols indicate the use of pulse flanks; and arrowheads located freely on a connection line between two blocks denote the utilization of the pulse potentials.

The oscillations V and V' are subjected to amplitude limitation in the limiter or clipper stages 1 and 2 respectively. Amplifiers 3, 4 respectively amplify the clipped signals $V_1$, $V_2$ and pass them to respective differentiating members 5, 6 with the result that pulses P5, P6 are produced at the zero passages of the original oscillations V and V', as mentioned above.

These pulses switch bistable multivibrators 7, 8 which produce respective rectangular voltages as well as the corresponding inverted rectangular voltages designated $\overline{V7}$, $\overline{V8}$. In the following differentiating stage 9, 10 the rectangular voltages are differentiated and respective sharply peaked pulses P9, P10 are produced. These are supplied to rectifiers 11, 12, respectively, which permit only the positive pulses P11, P12 to pass through for controlling a bistable multivibrator 13.

In the illustrated example, the relative phase angle of oscillation V at channel terminal $S_2$ is measured with respect to the oscillation V' at channel terminal $S_1$. For this purpose, the bistable multivibrator 13 must be switched to conductive condition by a pulse P12 derived from the oscillation V' and must be switched to blocked condition by a pulse P11 derived from oscillation V. The measuring operation is switched on and off by an AND gate 14 which for the duration of a positive potential at one of the input leads lets the pulses pass through from the other input lead.

The output lead of the bistable multivibrator 13 which is positive when the multivibrator is in conducting condition, controls a measuring gate 15 which passes high-frequency pulse trains to an electronic pulse counter 16. These pulse trains are produced from an oscillation generated in a square-wave generator 17 through a differentiating member 18 and a rectifier 19. The jump in potential required for controlling the AND gate 14 is produced in a bistable multivibrator 20. A pushbutton switch 21 places a positive potential upon a differentiating member 22 which produces from the ascending flank a positive pulse that is supplied through a rectifier 23 to the bistable multivibrator. The rectifier 23 suppresses the negative pulse resulting when the pushbutton switch 21 is being released.

The switching pulse for turning the bistable multivibrator 20 to blocked condition is derived from the bistable multivibrator 13. In order to have each measuring operation performed completely, the switching pulse must be produced when the bistable multivibrator 13 is being switched to blocked condition. In blocked condition, the second output lead of this multivibrator has a positive potential from whose front ascending flank a differentiating stage 24 produces a positive pulse. A rectifier 25 passes this positive pulse to a frequency divider 26 which issues an output pulse for each $n$-th pulse occurring at its input. This output pulse is again differentiated in a stage 27. A rectifier 28 passes the positive differentiated pulses to the bistable multivibrator 20 which thus is switched to blocked condition after occurrence of $n$-measuring operations. This switching operation permits the positive potential at the AND gate 14 to decay and thus blocks the AND gate 14.

This serves the purpose of automatically repeating the measuring operation. The number of measuring operations is determined by the division ratio $1:n$ of the frequency divider 26. The arithmetic mean value is directly formed in the pulse counter 16. If the number of the division ratio corresponds to a digital position which is greater than unity, in the decimal system 10 and, for example, in the binary system "No. 2," i.e., 10 (binary) then the arithmetic means can be formed in that all positions of the result whose digital value is smaller than the one corresponding to the division ratio, are not indicated. For example, the pulse counter 16 is suitable for storing (memorizing) four digit positions 1 . . . 4. Assume that the measuring results are two-digit numbers and that the division ratio of the frequency divider 26 is 100:1; then the two digit positions 1 and 2 of the pulse counter 16 directly indicate the arithmetic mean from 100 measurements.

As mentioned in the introduction, the digital interpretation may have erroneous results in cases where the oscillations are irregular. However, further errors may occur when regular oscillations are equal in phase or possess an only small phase difference. The sources of error in these cases reside in the inertia of the electronic switching devices. Thus the bistacle multivibrator 13 is switched to conductive condition periodically in the ratio of the pulse length to the length of the pulse repetition period which, for example, at a phase angle of 1° and a period of 360° corresponds to 1/360. The reverse condition occurs when the phase angle amounts to 359°, for example, in which case the above-mentioned ratio is 359/360. It is readily apparent that for a ratio of active time to idle time corresponding to 1:360 an immeasurably slight departure of the electronic components, be it due to aging or temperature effects, may suffice to cause faulty results.

Now, according to my invention, the system is provided with a phase comparator circuit PC which controls the bistable multivibrator 13 in such a manner that for phase angles smaller than twice the irregularity plus an additional safety amount, the switching of the multivibrator into the inverse condition is delayed by the duration of one full period. For simplicity, the range of the phase angles in which the delay is required will be denoted by $\tau$. Due to this delay, the ratio of pulse duration to length of the period of the bistable multivibrator for a phase angle of 1° becomes 361:720. In other words, the digital measurement for a phase angle of 1° becomes 361°. The indicator 16 of the system is adapted to show values greater than 360°.

The control of the phase comparator circuit PC is effected from the bistable multivibrator 7 or 8. One control signal is in phase and one signal is in phase opposition with respect to the original oscillations V (at $S_2$) or V' (at $S_1$). For discriminating whether the switching into the conducting or the switching into the blocked condition is to be delayed, a pulse is produced in dependence upon the rectangular voltages that are in phase with the oscillation V' ($S_1$) and in phase opposition to the oscillation V ($S_2$). To accomplish this the two signals $\overline{V7}$, V8 are first differentiated in respective stages 29, 30. Rectifiers 31, 32 permit only the positive pulses to pass. Each pulse is brought together with the rectangular voltage of the other signal V8 and $\overline{V7}$ in an AND gate 33, 34. The pulse passing through the latter AND gate passes through an OR gate 35 to another AND gate 36 which during measuring is kept blocked by the bistable multivibrator 20. The output pulses reach a monostable multivibrator 37 which delays them an interval of time corresponding to the phase angle $\tau$. The pulse flanks are differentiated in a stage 38, and a rectifier 39 permits only the positive pulses to pass through.

Two rectangular-wave voltages are applied together to an AND gate 40, one, V8, being in phase with the oscillation V' ($S_1$), and the other, $\overline{V7}$, in phase opposition to the oscillation V ($S_2$). During the interval of time in which these two rectangular voltages have a positive potential, an output signal is issued and supplied to another AND gate 42 together with the pulse coming from the stage 39. In the event of time coincidence the output pulse of stage 39 passes to a bistable multivibrator 44 which is thereby switched to blocked condition.

The two rectangle voltages, $\overline{V8}$, V7 that are in phase opposition to those supplied to the AND gate 40, are applied to an OR gate 41. Consequently, the OR gate 41 issues for each positive rectangular voltage a positive potential which is supplied to an AND gate 43 together with the pulse from the stage 39. In the event of time coincidence, the pulse from stage 39 is passed to the bistable multivibrator 44 which is thereby switched to conducting condition. The output pulse of multivibrator 44, which in conducting condition of the latter has a positive potential, is supplied to an astable multivibrator located in the stage 13. This astable multivibrator, during its conducting phase, has the effect that the bistable multivibrator likewise located in stage 13 cannot be switched.

Figure 2:
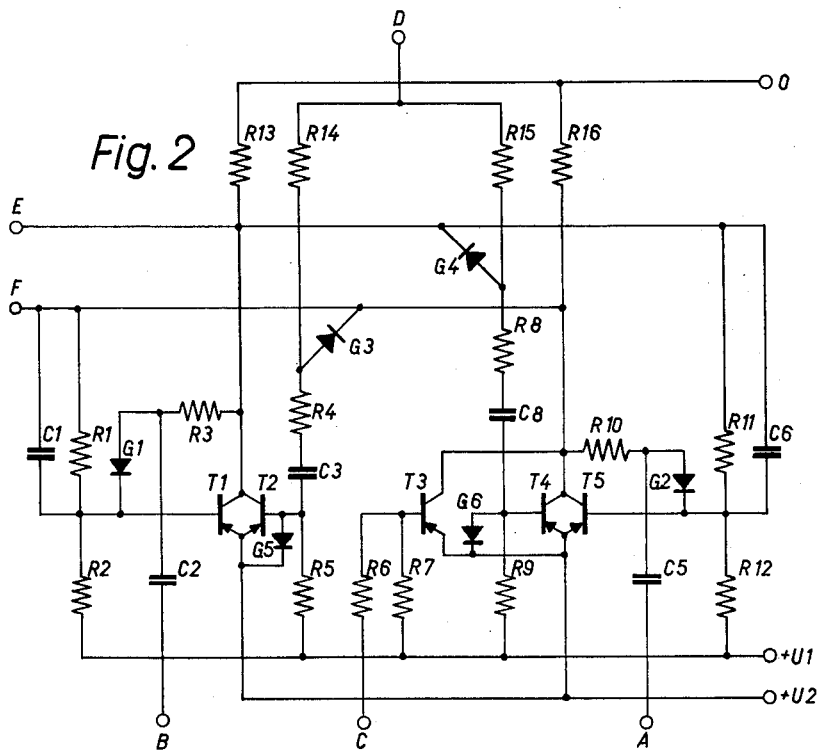
FIG. 2 is the circuit diagram of a bistable multivibrator which forms part of the system according to FIG. 1, and whose switching conditions are controllable by an astable multivibrator.

As mentioned, the circuit diagram of the stages 9 to 14 is separately shown in FIG. 2. The bistable multivibrator for controlling the measuring gate 15 comprises transistors T1 and T5 with respective load resistors R13 and R16 to which the output terminals E and F are connected. The feedback coupling from transistor T5 to transistor T1 is effected by a capacitor C1 and a parallel resistor R1. The feedback coupling from transistor T1 to transistor T5 extends through a capacitor C6 and a parallel resistor R11. The transistor T1 is controlled from the input terminal B through a capacitor C2, a resistor R3 and a diode G1. Analogously, the transistor T5 is controlled from input terminal A through a capacitor C5, a resistor R10 and a diode G2.

A transistor T3, connected parallel to transistor T5, is controlled from input terminal C through a resistor R6. Two transistors T2 and T4 form together with the timing members, namely capacitors C3, C4 and resistors R4, R8, an astable multivibrator. Respective diodes G3 and G4 are connected between the collectors of the two transistors T2, T4 and the time-determining member controlled by the respective transistors. The input terminal D is connected through resistors R14 and R15 with the anodes of respective diodes G3 and G4. The base-emitter voltage of transistors T2 and T4 is produced through the diodes G5 and G6. With zero potential at input terminal C, the transistor T3 is conducting whereby the collector of transistor T5 is kept on the potential +U1. As a result, signals at input terminal A can temporarily block the transistor T5 but cannot change the collector potential. As soon as a positive potential is placed on the base of the transistor T3, the latter transistor is blocked and the collector potential is then determined by the transistor T5. A pulse at the input terminal A is differentiated at the capacitor C5 and the resistor R10, and the positive pulse is passed through the diode G2 to the base of transistor T5 whereby this transistor is blocked. The collector and thus the output terminal F are brought to the potential 0 through the resistor R16. This change in potential is transmitted through capacitor C1 to the base of transistor T1. The negative pulse thus produced causes transistor T1 to become conductive, and its collector together with output terminal E now assume the potential +U1. The resistors R1 and R11 maintain the potentials fixed at the respective bases of transistors T1 and T5.

A change in potential at input terminal B is differentiated at capacitor C2 and resistor R3, and the positive pulse is applied through the diode G1 to the base of transistor T1. The transistors T1 and T5 are switched through capacitors C1 and C6. As a result, the output terminal E receives the potential 0, and the output terminal F the potential +U1.

When transistor T5 is conducting, placing a potential +U1 at input terminal D applies this potential through resistors R14 and R4 to the capacitor C3. Since the cathode of diode G4 exhibits the potential 0, when transistor T5 conducts, the potential cannot become effective upon the capacitor C4. The potential +U1 at terminal D neutralizes any existing charge on the capacitor C3 so that both plates exhibit a voltage +U1.

The arrival of a positive pulse at the base of transistor T5 causes this transistor to be turned off and turns on transistor T1. The diode G3 passes the jump of potential from the collector of transistor T5 through resistor R4 to the capacitor C3. If the capacitor C3 is charged (because there has been no input pulse at D) the jump in potential does not change the charge. However, if capacitor C3 has been neutralized to the value +U1 the jump in potential causes a current flow to the base of transistor T2, which is limited by the resistor R4. This current renders the transistor T2 conducting for the duration of the charging time of the capacitor C3. During this charging time a pulse at B for the purpose of blocking the transistor T1 cannot change the condition of the bistable multivibrator.

The same performance also takes place when the bistable multivibrator is in the second condition since the arrangement of the transistor T4 is symmetrical to that of the transistor T2.

The time constant of resistor R4 and capacitor C3, and the time constant of resistor R8 and capacitor C8, each correspond to the phase angle τ. Consequently, switching pulses for changing the condition of the bistable multivibrator, when a positive potential is applied to the input terminal D, cannot change the potentials at the output terminals E and F during the interval of time corresponding to the value τ.

Figure 3:
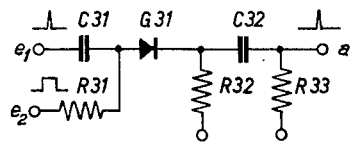
FIG. 3 is the circuit diagram of an AND gate corresponding to a number of gate stages denoted by 33, 34, 36, 42 and 43 respectively in FIG. 1.

As mentioned, FIG. 3 shows the circuit diagram of an AND gate with an input terminal e1 for pulses and an input terminal e2 for square-wave voltages. This circuit diagram corresponds to stages 33, 34, 36, 42 and 43 in FIG. 1. The cathode of diode G31 is subjected to the potential +U1 through the resistor R32, whereby it becomes conducting only when a potential +U1 is applied to the input terminal e2. During this conducting phase a positive pulse applied to input terminal e1 can reach the output terminal a through capacitor C31, diode G31 and capacitor C32. The output terminal a is kept at the potential 0 with the aid of the resistor R33.

Figure 4:
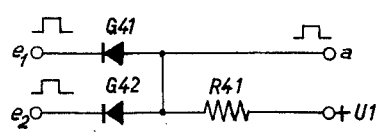
FIG. 4 is the circuit diagram of another gate stage which forms part of the system shown in FIG. 1 where it corresponds to item 40.

FIG. 4 shows the circuit for the AND gate 40 of FIG. 1 for the two square-wave voltages from stages 7 and 8. The resistor R41 can supply the potential +U1 to the output terminal a only when the cathodes of both diodes G41 and G42 are likewise at the potential +U1.

Figure 5:
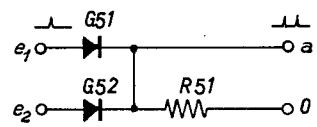
FIG. 5 is the circuit diagram of an OR gate as employed in the system of FIG. 1 at items 35 and 41.

The circuit design of the OR gate of stages 35 and 41 in FIG. 1 corresponds to FIG. 5. The diodes G51 and G52 permit each positive potential to reach the output terminal a. The resistor R51 discharges the output terminal a down to the potential 0.

The operation of the phase comparator circuit PC according to FIG. 1 will be described with reference to the pulse diagrams shown in FIGS. 6 to 10. For simplification, symbols as known from algebra of circuitry are assigned to the various voltages. The bistable multivibrator 8, in response to the oscillation V' at $S_1$, produces an in-phase square-wave voltage V8 or S8 and a square-wave voltage $\overline{V8}$ or $\overline{S8}$ in phase opposition to the oscillation $S_1$. The differentiation of these square-wave voltages and the use of the resulting positive pulses are designated by S8' and $\overline{S8}'$, respectively.

The bistable multivibrator 7 analogously produces from the oscillation V at $S_2$ the voltages V7 or S7 and $\overline{V7}$ or $\overline{S7}$. The positive differentiated pulses are denoted by S7' and $\overline{S7}'$. The function of an AND gate is denoted by & and the function of an OR gate is denoted by v. The phase angle by which the measurement must be delayed is again denoted by τ. For visual distinction, the rectangular voltages S7 and $\overline{S7}$ appear in the diagrams higher than the rectangular voltages S8 and $\overline{S8}$. The numerals on the left side are the designations of the stages in the system according to FIG. 1. The symbols at the right of the diagrams indicate the algebraic form of the function performed.

Figure 6:
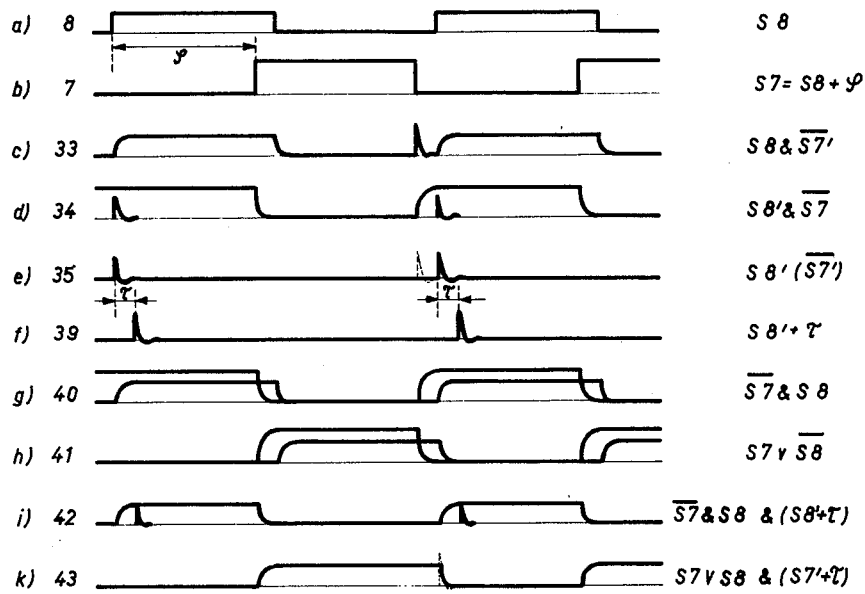
FIGS. 6 to 10 are respective groups of voltage-time curves representing explanatory pulse diagrams with reference to the system of FIGS. 1 to 5.
Figure 7:
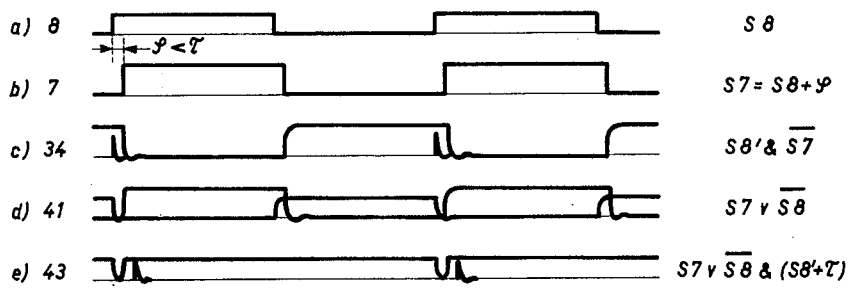
Figure 8:
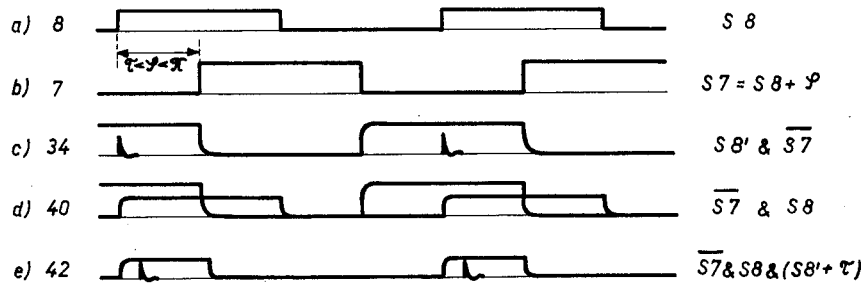
Figure 9:
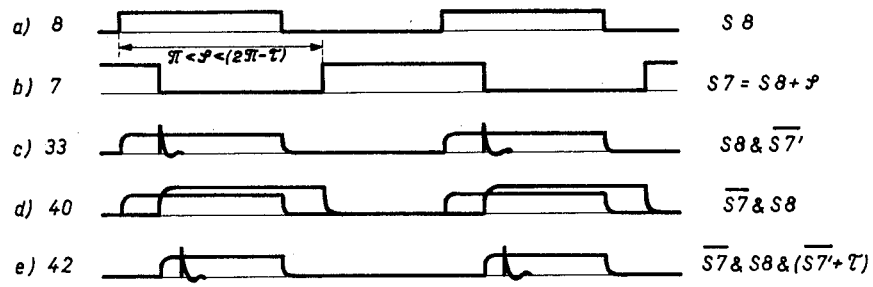
Figure 10:
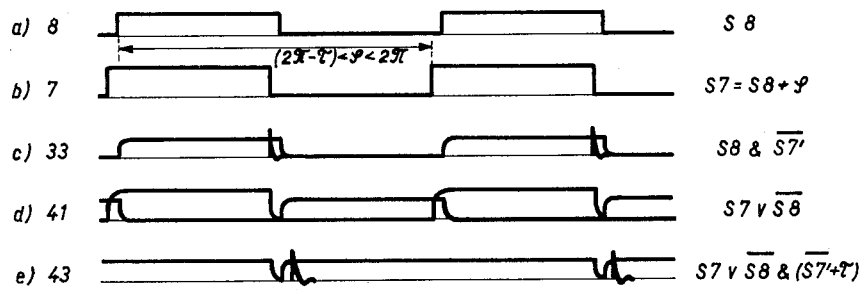

FIG. 6 shows pulse diagrams for the discriminating action of all stages in the phase comparator circuit CP of FIG. 1. The voltages S8 (FIG. 6a) and the voltage $\overline{S7}$ (FIG. 6b) which is displaced by the phase φ, are both differentiated and rectified. The pulse S8' is passed to the AND gate 34 together with the voltage $\overline{S7}$ (FIG. 6d). Also, the pulse $\overline{S7}'$ and the voltage S8 are applied to the AND gate 33. For each phase angle φ, an output pulse is produced in one of the two gates 33 or 34. For $0<\varphi<\pi$ the pulse is produced in gate 34; and for $\pi<\varphi<2\pi$ the pulse is produced in gate 35. The OR gate 35 passes the pulse thus produced to the AND gate 36 (FIG. 6e). The AND gate 36 is normally conducting and is shut off only by the switching-on pulse for the bistable multivibrator 13 coming from the bistable multivibrator 20. This AND gate 36 is switched off in order not to disturb the measuring operation in the limit cases $\varphi=\pi$. The output pulse is delayed by the time τ in the monostable multivibrator 37. The change in potential of this monostable multivibrator 37 is differentiated in the stage 38, rectified, and the positive pulse is available at the output side of the rectifier 39 (FIG. 6f). An AND gate 40 brings the two voltages S7 and $\overline{S8}$ (FIG. 6h) together. Another AND gate 42 passes the pulse from the rectifier 39 to the bistable multivibrator 34 if the resultant voltage from the AND gate 40 coincides in time with this pulse (FIG. 6i). The AND gate 43 operates in phase opposition to the AND gate 42 (FIG. 6k) due to the interdependence of the AND gate 40 and the OR gate 41. Consequently, the pulse from the rectifier 39 is coincident either with the voltage from the AND gate 40 or with the voltage from the OR gate 41. The phase angle φ assumed in FIGS. 6a and 6b results in coincidence in the AND gate 42, whereby the bistable multivibrator 44 is triggered into its blocking condition. Consequently, the potential 0 is applied to the input terminal D of the stage 13 whereby each pulse of the phase measuring operation becomes effective.

In the following FIGS. 7 to 10, the diagrams *a* and *b* represent the phase position of the signals S7 and S8. Relative to positions of coincidence between pulses with the rectangular voltages, the pulse diagrams of only those stages are illustrated that produce an output pulse.

FIGS. 7*a* and 7*b* show the two signals S7 and S8 in a case where the phase angle $\varphi$ is between 0 and $\tau$. FIG. 7*c* shows the voltage curve at the AND gate 34 where the pulse S8' and the voltage $\overline{S7}$ coincide. The pulse S8' delayed by $\tau$ is in coincidence with the positive output voltage at the OR gate 41 (FIG. 7*d*), as is shown in FIG. 7*e*. The pulse S8' switches the bistable multivibrator 44 to conductive condition whereby a positive potential appears at the input terminal D of the stage 13. This positive potential then affects capacitors C3 or C8, as explained in FIG. 2. When the AND gate 14 is conducting, the pulse S8' switches the bistable multivibrator 13 to the conducting condition. However, the next following pulse S7', arriving in less than time $\tau$, cannot switch the multivibrator during the time interval $\tau$, because the astable multivibrator maintains this condition independently of the switching pulses for the duration of $\tau$. Consequently, only the second pulse S7' arriving $2\tau$ later can switch the bistable multivibrator. Consequently, the measuring gate 15 remains closed for the period $2\pi+\varphi$.

The phase angle $\varphi$ between the rectangular voltages S7 and S8 is between $\tau$ and $\pi$ in the diagrams according to FIGS. 8*a* and 8*b*. In this case, coincidence of pulse S8' and voltage $\overline{S7}$ (FIG. 8*c*) takes place in the AND gate 34. The pulse delayed by $\tau$ comes to coincidence with the output voltage from the AND gate 40 (FIG. 8*d*) in the AND gate 42. The pulse S8' switches the bistable multivibrator 44 to its blocked condition, and no potential is effective at the input terminal D of the stage 13. Now the bistable multivibrator 13 switches alternately with each pulse S8' and S7'.

The phase angle $\varphi$ for the diagrams in FIGS. 9*a* and 9*b* is in the range between $\pi$ and $2\pi-\tau$. Coincidence occurs in the AND gate 33 of the pulse $\overline{S7'}$ and the voltage S8 (FIG. 9*c*). Coincidence also takes place in the AND gate 42 between the output voltage of the AND gate 40 (FIG. 9*d*) on the one hand and the pulse $\overline{S7'}$ delayed by $\tau$ (FIG. 9*e*). The bistable multivibrator 44 switches to blocked condition, and the input terminal D of stage 13 has the potential 0.

The last case to be investigated relates to a phase angle $\varphi$ in the range between $2\pi-\tau$ and $2\pi$ according to FIGS. 10*a* and 10*b*. The first coincidence occurs in the AND gate 33 between the pulse $\overline{S7'}$ and the voltage S8 (FIG. 10*c*). The second coincidence occurs in the AND gate 43 (FIG. 10*e*) between the output voltage of the OR gate 41 (FIG. 10*d*) and the pulse S8' delayed by $\tau$. The output pulse of the AND gate 43 switches the bistable multivibrator 44 to conducting condition, whereby the input terminal D of stage 13 assumes a positive potential. By means of a first pulse S8', the bistable multivibrator 13 is switched to conducting condition, and the next pulse S7' switches this multivibrator to blocked condition. The next pulse 8' now arrives in less than time $\tau$. However, in this case the astable multivibrator prevents switching to conducting condition during the interval $\tau$. Thus, only the next following pulse S8', following the reverse switching of the astable multivibrator by $2\pi$, can again switch the bistable multivibrator to conducting condition. Consequently, the measuring gate remains open during the time $\varphi$ and remains closed during the time $2\pi+(2\pi-\varphi)$. Thus, only those pulses arriving through AND circuit 43 cause the potential +U1 to be applied at point D. This occurs only when $\tau>\pi$ and when $2\pi-\tau<\varphi<2\varphi$.

To those skilled in the art, it will be obvious upon a study of this disclosure that with respect to circuitry and components my invention is amenable to a variety of modifications and hence may be given embodiments other than particularly illustrated and described herein, without departing from the essential features of my invention and within the scope of the claims annexed hereto.

I claim:
1. A system for digital measurement of the phase angle between two oscillations of the same frequency, comprising a bistable multivibrator switchable between conductive and blocked conditions under control by sequential control pulses indicative of the respective phase positions of the first and second ocillations respectively; a source of high-frequency pulses; a digital pulse counter; a normally closed gate connected between said source and said counter and connected to and controllable by said multivibrator to open for passing a pulse train from said source to said counter when said multivibrator is in conducting condition whereby said counter provides a measurement of the phase angle between said first and second oscillations; repetition control means connected with said multivibrator for repeating the measurement a predetermined number of times; a phase comparator circuit responsive to said first and second oscillations; and an astable multivibrator connected to said phase comparator circuit and controlled thereby and connected with said bistable multivibrator for preventing the initiation of the blocked condition of said bistable multivibrator until arrival of the control pulse indicative of the phase position of said second oscillation and preventing the initiation of said conductive condition until arrival of the control pulse indicative of the phase position of said first oscillation and following said second oscillation pulse, whereby measuring errors at very small and large phase angles are minimized.

2. A system for digital measurement of the phase angle between two oscillations of the same frequency, comprising first converting means for deriving a periodic first control pulse from a first one of said two oscillations; second converting means for deriving a periodic second control pulse from the second oscillation, said control pulses being indicative of the respective phase positions of said two oscillations; a bistable multivibrator connected to said two converting means and switchable to conducting and blocked conditions by said first and second control pulses respectively; a source of measuring pulses of higher frequency than said control pulses; digital counter means; a gate connected between said source and said counter means and connected to and controllable by said multivibrator to pass a train of measuring pulses from said source to said counter means only when said multivibrator is switched to conducting condition by said first control pulses whereby said counter means provides a measurement of the phase angle between said two oscillations; repetition control means connected between one of said converting means and said multivibrator for causing said multivibrator to repeat the measurement a given number of times; a phase comparator circuit connected to said first and second converting means; and an astable multivibrator connected to and controlled by said phase comparator circuit for minimizing measuring errors at very small and very large phase angles, said astable multivibrator being connected to said bistable multivibrator so as to prevent the initiation of said blocked condition until occurrence of said second control pulse and prevent the initiation of said conductive condition until occurrence of the next following first control pulse.

3. A system as claimed in claim 1, further comprising means for disconnecting said phase comparator circuit during the measuring operation.

4. A system for measurement of the phase angle between two oscillations of the same frequency, comprising a bistable multivibrator switchable between conductive and blocked conditions under control of sequential control pulses indicative of the respective phase positions of the first and second oscillations respectively; measuring means for indicating the period during which said multivibrator is in one of its stable states, said measuring means including said multivibrator and comprising means for providing pulses to said multivibrator and means for indicating the number of pulses passed by said multivibrator; repetition control means connected with said multivibrator for repeating the measurement a predetermined number of times; and delay means connected with said multivibrator for maintaining said multivibrator in its prevailing condition after each pulse input for a predetermined time period, said delay means including electrical members having a time constant.

References Cited by the Examiner

UNITED STATES PATENTS

| | | | |
|---|---|---|---|
| 2,866,092 | 12/58 | Raynsford | 328—133 X |
| 2,877,416 | 3/59 | Grisdale | 324—83 |
| 2,918,625 | 12/59 | Houghton et al. | 324—83 |
| 2,935,609 | 5/60 | Rabin et al. | 328—133 X |
| 2,977,538 | 3/61 | Secretan | 324—83 |
| 3,013,211 | 12/61 | Garabedran | 328—133 X |

WALTER L. CARLSON, *Primary Examiner.*